United States Patent [19]

Lundsgaard et al.

[11] 4,056,840

[45] Nov. 1, 1977

[54] LINE PROTECTOR FOR COMMUNICATIONS CIRCUIT

[75] Inventors: Paul S. Lundsgaard; William S. Sedlacek, both of Chicago, Ill.

[73] Assignee: Reliable Electric Company, Franklin Park, Ill.

[21] Appl. No.: 685,724

[22] Filed: May 12, 1976

[51] Int. Cl.[2] .......... H02H 3/22

[52] U.S. Cl. .......... 361/124; 361/119

[58] Field of Search .......... 317/16, 31, 40 A, 62, 317/66, 61.5; 337/28, 32, 33, 34

[56] References Cited

U.S. PATENT DOCUMENTS

| | | | |
|---|---|---|---|
| 1,350,329 | 8/1920 | Parker | 337/32 |
| 3,281,625 | 10/1966 | Wanaselja | 317/62 X |
| 3,813,577 | 5/1974 | Kawiecke | 317/62 X |
| 3,886,408 | 5/1975 | Klayum et al. | 317/16 |

*Primary Examiner*—J D. Miller

*Assistant Examiner*—Patrick R. Salce

*Attorney, Agent, or Firm*—Olson, Trexler, Wolters, Bushnell & Fosse, Ltd.

[57] ABSTRACT

A line protector for communications circuits comprises a gas tube having external contact surfaces for connections to communication lines and to ground. A conductive member is proximate to the contact surfaces that are associated with the communication lines. A dielectric substance interposed between the conductive member and the last-mentioned contact surfaces melts upon overheating of the protector resulting from the excessive line current. The conductive member, due to its resiliency, engages the subjacent contact surface or surfaces thereby resulting in a direct short circuit between the protected line and ground. A shield over at least part of the gas tube in the region of the conductive member prevents potting compound or foreign matter from obstructing the function of the conductive member.

8 Claims, 12 Drawing Figures

LINE PROTECTOR FOR COMMUNICATIONS CIRCUIT

BACKGROUND OF THE INVENTION

This invention relates to line protectors for communications circuits, more particularly to line protectors comprising gas-filled tubes.

Gas-filled tubes of the foregoing type are generally known and are used to protect telephone lines and related equipment in communications circuits. In one mode of operation high voltage transients across the protected line causes an arc gap betwen the electrodes resulting in a current discharge to ground. Under these conditions the unit is self-restoring, i.e., nothing need to be done in order to reset the unit for further operation. However, if a current in the circuit between the electrodes causes the gas tube to be placed in a so-called "glow mode," the resistance caused by the discharge across the gap results in a rise in temperature while the current is still flowing. Under these conditions the gas tube "glows", i.e., becomes hot and may tend to fail causing an open circuit condition. This can result in damage to the equipment or possibly a fire.

According to the present invention, an arrangement is provided for establishing a direct metallic short circuit from line to ground, bypassing the electrodes, when the gas tube becomes sufficiently overheated as a result of excessive current flowing therethrough.

OBJECTS AND SUMMARY OF THE INVENTION

An object of the invention is to provide a line protector of the type stated which utilizes a dielectric material that melts as a result of heat generated when the tube operates in the glow mode, whereby the melting of the dielectric material causes a conductive member externally of the tube to form a short circuit between the electrodes (one of which is connected to ground) so as to ground the protected line.

A further object of this invention is to provide a line protector of the type stated which is particularly suitable for three element gas tubes in which the center or ground electrode is tubular and coaxially receives opposed end electrodes which are respectively connected to the line or lines to be protected. The center electrode is connected to ground.

In accordance with the foregoing objects the line protector comprising a gas-filled tube therein, at least one pair of electrodes separated by insulation and defining an arc gap, connectors electrically insulated from each other and being in respective electrical contact with the electrodes, each connector having an electrically conductive surface external of the gas tube, a resilient conductive member outside of said tube and having a first part in proximity with a first of said external surfaces and also having a second part in proximity with a second of said external surfaces, the resiliency of said conductive member biasing said conductive member in a direction to effect electrically conductive connection of said external surfaces, and a meltable dielectric substance interposed between said conductive member and said tube, said dielectric substance being meltable upon heating of said last-mentioned surface due to an overcurrent condition in the tube, said substance being normally engaged by said conductive member to prevent electrically conductive connection of said surfaces except upon melting of said substance so that upon said melting a direct short circuit is provided between said external surfaces.

DETAILED DESCRIPTION

Figure 1:
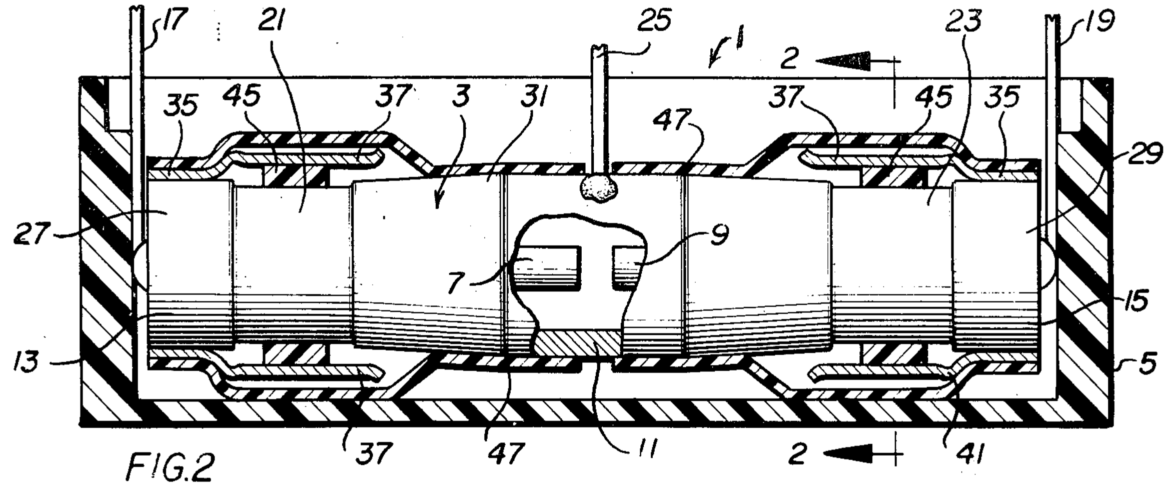
FIG. 1 is a longitudinal sectional view of a line protector constructed in accordance with and embodying the present invention.
Figure 2:
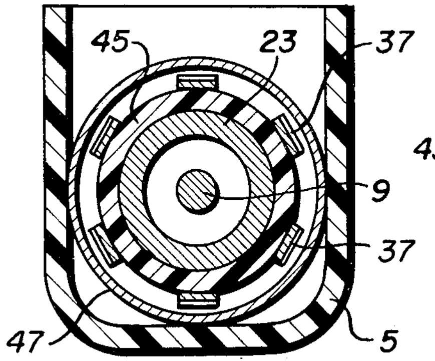
FIG. 2 is a sectional view taken along line 2—2 of FIG. 1.
Figure 3:
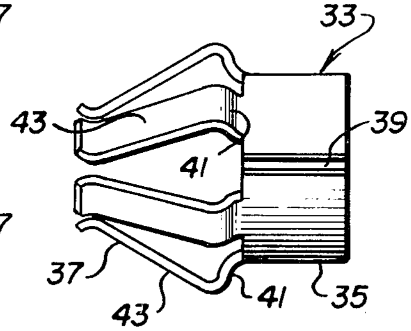
FIG. 3 is a side elevational view of a conductive spring clip which forms part of the present invention.
Figure 4:
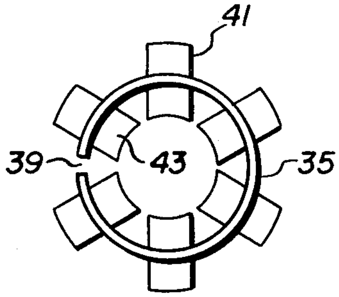
FIG. 4 is an end elevational view of the spring clip of FIG. 3.

Referring now in more detail to the drawing and particularly to FIGS. 1–4, there is shown a line protector 1 that comprises a gas filled tube 3 that is housed in an open top molded plastic shell 5 or like container. The shell 5 may be filled with a suitable insulating potting compound so as to insulate the gas tube 3 and components associated therewith from the environment. The potting compound is not shown so as not to obscure in the drawing the structure of the protector.

The gas tube 3 comprises first and second electrodes in the form of end electrodes 7 and 9 that provide an arc gap therebetween. The gas tube also has a third or center electrode 11 which is tubular and which coaxially receives the end electrode 7, 9. Arc gaps are formed in the tube by the radial spacing of the end electrodes 7, 9 and by the inner surface of the center electrode 11. The end electrodes 7, 9 are conductively joined to connectors 13, 15 which, in turn, have lead wires 17, 19 soldered or otherwise joined thereto. The lead wires 17, 19 are connected to the communication lines to be protected.

The connectors 13, 15 are separated from the center electrode 11 by tubular glass or ceramic insulating spacers 21, 23. Accordingly, there is provided a first pair of electrodes made up of the electrode 9 and the center electrode 11 and a second pair of electrodes made up of the electrode 7 and the center electrode 11. A conductor wire 25 is soldered to the outer conductive surface of the electrode 11, and the wire 25 is adapted to be connected to ground. As a result, if there is an overvoltage or overcurrent condition on either line to which wires 17, 19 are connected, the discharge to the center electrode 11 will be conducted to ground through the wire 25.

The external surfaces 27, 29 of the connectors 13, 15 are respectively axially spaced from the external surface 31 of the center electrode 11. Thus the external surface 31 may be considered to be the exposed surface of a connector portion of the electrode 11 while the internal surface portion of the electrode 11 may be considered as the electrode portion, that is, the portion or surface which received the arc discharge.

A resilient sheet metal conductive member 33 is on the outside of the gas tube and contains a first part or band 35 and a second part made up of a series of fingers 37. The band 35 surrounds and contacts the external surface 27 or 29, as the case may be. The band 35 has a longitudinal gap or slit 39 which resiliently spreads apart slightly during assembly of the band with the connector 13 or 15, whereby the band 35 tightly grips the connector 13 or 15. The fingers 37 are circumferentially disposed and project axially overlying and beyond the insulation spacer 21 or 23. In the normal or relaxed position, namely prior to assembly with the gas tube, each of the fingers 37 comprises a radially outwardly projecting section 41, the end of which has a radially inwardly projecting section 43.

As will be seen from FIG. 1, one band 33 is assembled with each connector 13 or 15. However, prior to assembly of the band 33 with the gas tube, a meltable dielectric substance is interposed between the gas tube and the fingers 37. In the form of the invention shown in FIG. 1, this meltable dielectric substance comprises a ring 45 which surrounds and overlies each insulation spacer 21 or 23. The ring 45 may be made out of any suitable low melting point wax or plastic and which may be pliable or resilient sufficiently to allow it to expand and be slipped over the connector 13 or 15. The ring 45 may also have a radial split (similar to 39 in the band 35) to facilitate assembly over the insulation spacers 21, 23.

The radial thickness of the ring 45 is sufficient to keep the fingers 37 out of contact with the external surface 31 of the center electrode 11 during normal operation of the gas tube. However, if an overvoltage condition on the line connected to the wire 19 creates an overcurrent condition, such overcurrent condition will be reflected in a heat buildup within the gas tube causing the associated dielectric ring 45 to melt. Consequently, the resilient fingers 37, normally held in tension by the ring 45, will be allowed to contract and engage the surface 31 so as to establish a direct metallic connection between the surface 35 and the surface 31. This grounds the line that is connected to the conductor 19. Multiple fingers 37 tend to divide the current among the fingers. In like manner, an overvoltage in the line connected to the wire 17 that results in melting of the associated ring 45 will cause a direct metallic connection between the surface 27 of the connector 15 and the surface 31.

The conductive member 33 or spring clip may be of various materials. One material that is suitable is a beryllium-copper, type CA 170. Beryllium-nickel and spring steels with high conductivity platings may also be used. The dielectric material of the ring 45 may be a resilient sealing wax that flows under excessive heating of the gas tube, for example, to about 350° F. Such heating occurs in low current conditions that put the tube in the glow mode condition. Another heat-producing situation might be created if a power line touches the line to be protected.

Sleeves 47 are heat shrunk over the bands 35, 35 and over the surface 31. This is done prior to assembly of the gas tube with the housing 5. The sleeves form protective shields that prevent potting compound or foreign matter from entering between the fingers 37 and the surface 31 when the potting compound is introduced into the housing 5. The sleeves 47 may be a known polyvinyl chloride or polyolefin resin. Under some circumstances it may happen that the further shrinking of a sleeve 47, upon overheating of the gas tube and melting of the ring 45, may result in the sleeve pressing against the fingers 37 to assure that they remain in firm contact with the surface 31.

Figure 5:
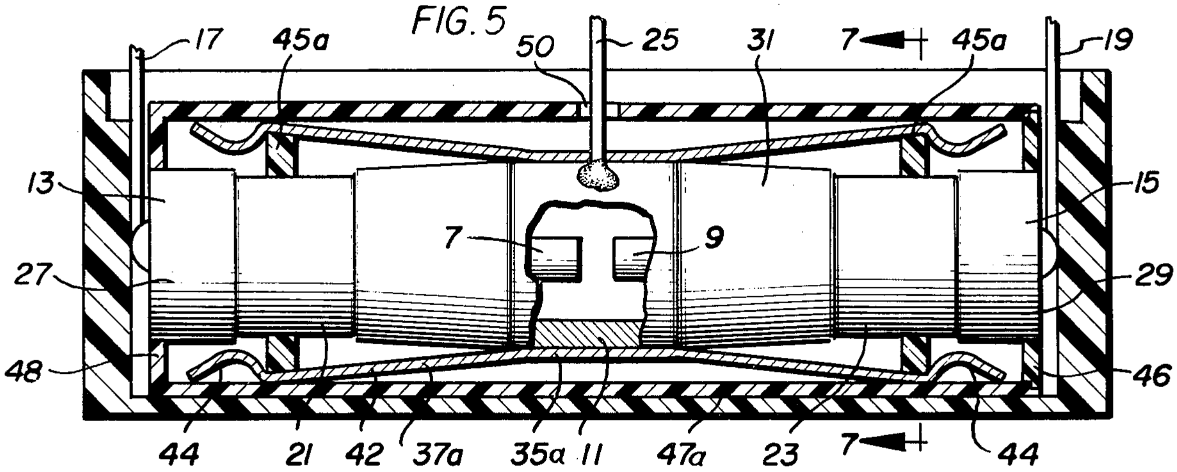
FIG. 5 is a longitudinal sectional view of a modified form of line protector in accordance with the present invention.
Figure 6:
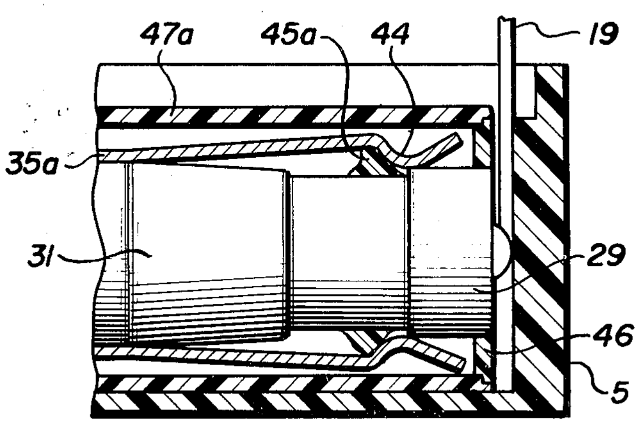
FIG. 6 illustrates a portion of the structure of FIG. 5 and showing the protector after the dielectric substance has been melted due to an overcurrent condition in the tube.
Figure 7:
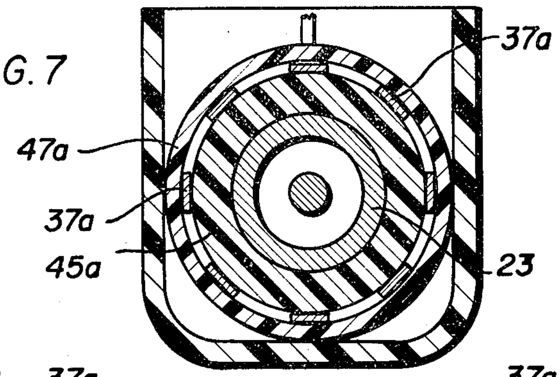
FIG. 7 is a sectional view taken along the line 7—7 of FIG. 5.
Figure 8:
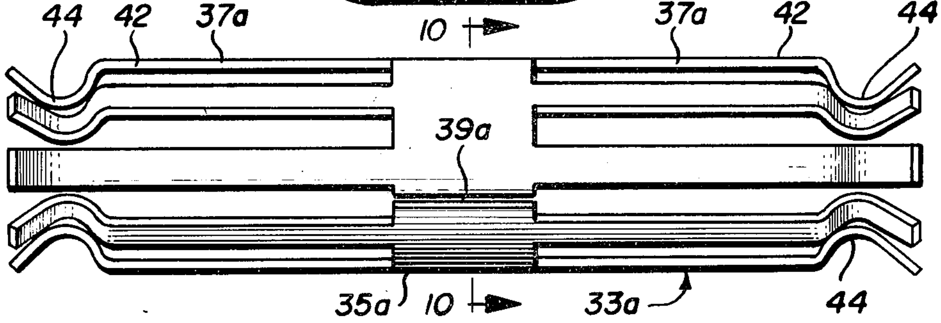
FIG. 8 is a side elevational view of the dual type spring clip embodied in the protector of FIGS. 5–7.
Figure 9:
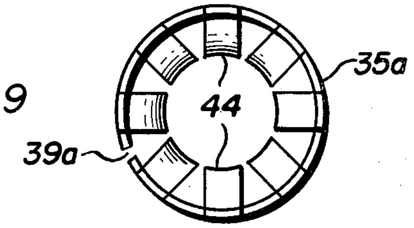
FIG. 9 is an end elevational view of the spring clip of FIG. 8.
Figure 10:
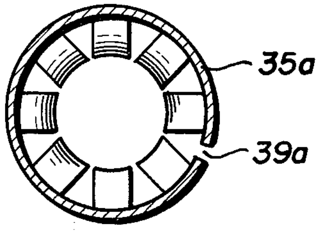
FIG. 10 is a sectional view taken along line 10—10 of FIG. 8.

FIGS. 5–10 show a modified form of the present invention in which like numbers indicate like parts described with respect to FIGS. 1–4. In FIG. 5, the dielectric rings **45*a* may be somewhat smaller in axial thickness than are the rings 45. One difference in the embodiment of FIGS. 5–10 over that of FIGS. 1–4 however, lies in the fact that the conductive member 33*a* is in the form of a dual spring clip. This dual spring clip has a central band 35*a* with an axial slit 39*a*. Projecting from opposite ends of the band 35*a* are spring fingers 37*a*. FIGS. 8–10 show the conductive member 33*a* prior to assembly with the gas tube 3. Each finger 37*a* has an axially extending section 42 that terminates in a generally radially inwardly bent U-shaped section 44. As in the case of the fingers 37 or FIG. 3, the fingers 37*a* are circumferentially spaced about the band 35*a***.

When the conductive member **33*a* is assembled with the gas tube 3 and the dielectric rings 45*a*, the band 35*a* tightly engages the outer surface 31 of the electrode 11. As shown best in FIGS. 5 and 7 the fingers 37*a* are expanded by the dielectric rings 45*a* so that the U-shaped sections 44 of the fingers are held out of engagement with the external surfaces 27, 29 of the connectors 13, 15**.

The gas tube of FIGS. 5–7, the conductive member **33*a* and the dielectric rings 45*a* are housed in a form-sustaining (i.e., somewhat rigid) plastic shield 47*a*. This shield 47*a* may be of a polycarbonate resin and is a tubular container having an end wall 48 with a central opening being sized for receiving the connector 13. The other end of the shield 47*a* has a press-fitted closure cap 46 also with a central opening sized to receive the connector 15. A radial hole 50 is formed in the cylindrical container wall for receiving the wire 25. The gas tube, ring 45*a* and member 33*a* are assembled with the shield 47*a* after which the assembly is placed within the housing 5 and then potted. The hole 50 and the holes through which the connectors 13, 15 project may be sealed if desired, but this is usually not needed since the viscosity and/or surface tension of the potting compound is high enough that no significant amount of potting compound gets inside the shield 47*a***.

Upon heating of the gas tube due to an overcurrent condition, one or more of the rings **45*a* melts, as shown in FIGS. 6, whereupon one or more of the finger sections 44 engages the external surface 27 or 29, as the case may be, of the associated connector 13 or 15** so as to provide a ground for the protected line.

Figure 11:
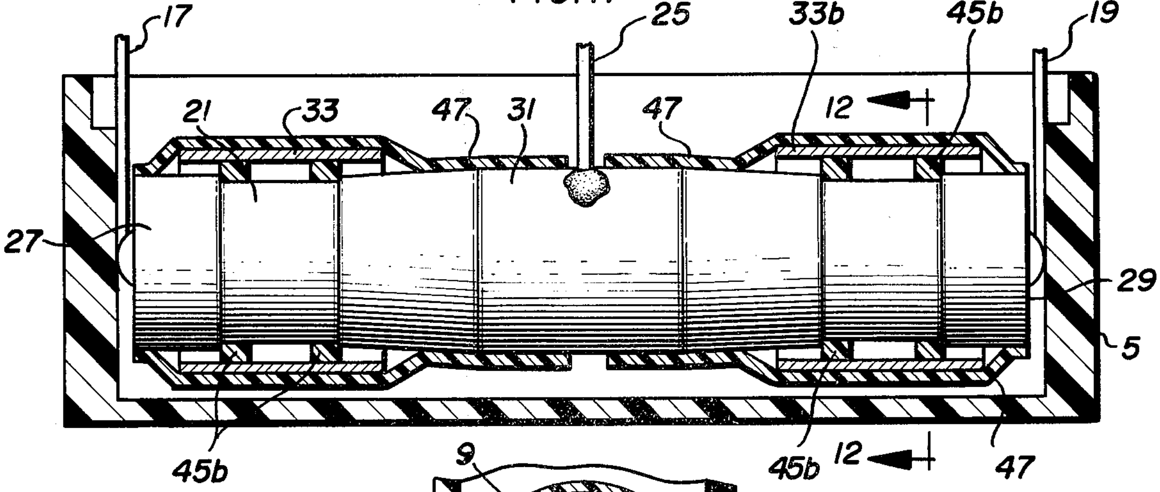
FIG. 11 is a longitudinal sectional view of a further modified form of line protector constructed in accordance with the present invention.
Figure 12:
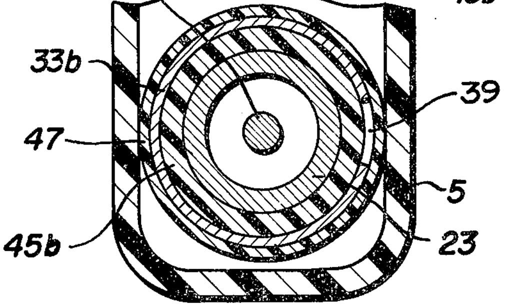
FIG. 12 is a fragmentary sectional view taken along line 12—12 of FIG. 11.

FIGS. 11 and 12 show a further form of the invention in which like reference numerals indicate like parts previously described. In the form of the invention in FIGS. 11 and 12, the conductive member **33*b* consists of an annular resilient ring having a slit 39 to enable it to be radially expanded and thereby fit over a pair of resilient dielectric rings 45*b*. These rings 45*b*, which may be split like the rings 33*b*, are preferably axially spaced and located at the opposite ends of the insulating spacer 21 or 23 which they surround. In any event, the rings 45*b* hold the annular conductive member 39*b* away from the external surfaces 27, 29 and the external surface 31. However, upon heating of the gas tube, due to an overcurrent condition, a ring 45*b* melts thereby causing the conductive member 33*b* to contract and engage surfaces 27, 31 or 29, 31,** as the case may be, and ground the line to be protected.

The invention is claimed as follows:

1. A line protector comprising a gas-filled tube therein, at least one pair of electrodes separated by insulation and defining an arc gap, connectors electrically insulated from each other and being in respective electrical contact with the electrodes, each connector having an electrically conductive surface external of the gas tube and surrounding the electrodes, a resilient conductive member outside of said tube and having a first part in proximity with a first of said external surfaces and also having a second part in proximity with a second of said external surfaces, the resiliency of said conductive member biasing said conductive member in a direction to effect electrically conductive connection of said external surfaces, said first and second parts respectively being in substantial surrounding relationship with said first and second surfaces, and a meltable dielectric substance interposed between said conductive member and said tube, said dielectric substance being meltable upon heating due to an overcurrent condition in the tube, said substance being normally engaged by said conductive member to prevent electrically conductive connection of said surfaces except upon melting of said substance so that upon said melting a direct short circuit is provided between said external surfaces over substantial areas of engagement with said member that surrounds said surfaces.

2. A line protector according to claim 1 in which one of said electrodes in tubular and provides an inner surface defining one side of the arc gap, the other electrode being within the tube, an insulating spacer is remote from said arc gap and separates the first and second external surfaces axailly of the tube, and said conductive member spans the axial space between said first and second surfaces.

3. A line protector according to claim 1 in which said first part is a band around one surface and the scond part is a series of circumferentially spaced fingers each biased by its resiliency toward said second surface, and said meltable substance is a ring substantially around said second surface and interposed between said fingers and said second surface so that upon said melting the engagement of said fingers and said second surface divides the current flowing from one surface to the other surface through said member.

4. A line protector according to claim 2 including a third electrode within the tube and having a third external surface of said tube, an additional insulation spacer is remote from said arc gap and separates first and third external surfaces axially of the tube, and said conductive member spans the axial space between said first and third surfaces, said conductive member having a band around said first surface and circumferentially spaced resilient fingers extending in opposite directions to overlie said second and third surfaces, said dielectric substance being substantially a ring interposed between each finger and the adjacent of said first and third surfaces so that upon said melting the engagement of said fingers with one of said first and third surfaces divides the current flowing from that engaged surface to said second surrface through said member.

5. A line protector according to claim 2 in which said conductive member is a resilient band around said first and second surfaces, and said dielectric substance comprises rings of material that prevents engagement of said band with either of said first and second surfaces except on melting of said material.

6. A line protector according to claim 1 including a housing, a shield over said gas tube at least in the region of said conductive member and said dielectric substance to prevent potting material that is introduced into the housing from lodging between the conductive member and said external surfaces.

7. A line protector according to claim 6 in which said shield is a heat-shrinkable member.

8. A line protector according to claim 6 in which said shield is a form-sustaining tube.

* * * * *